J. H. WELDON.
SPRING WHEEL.
APPLICATION FILED JUNE 5, 1911.
1,030,442.
Patented June 25, 1912.
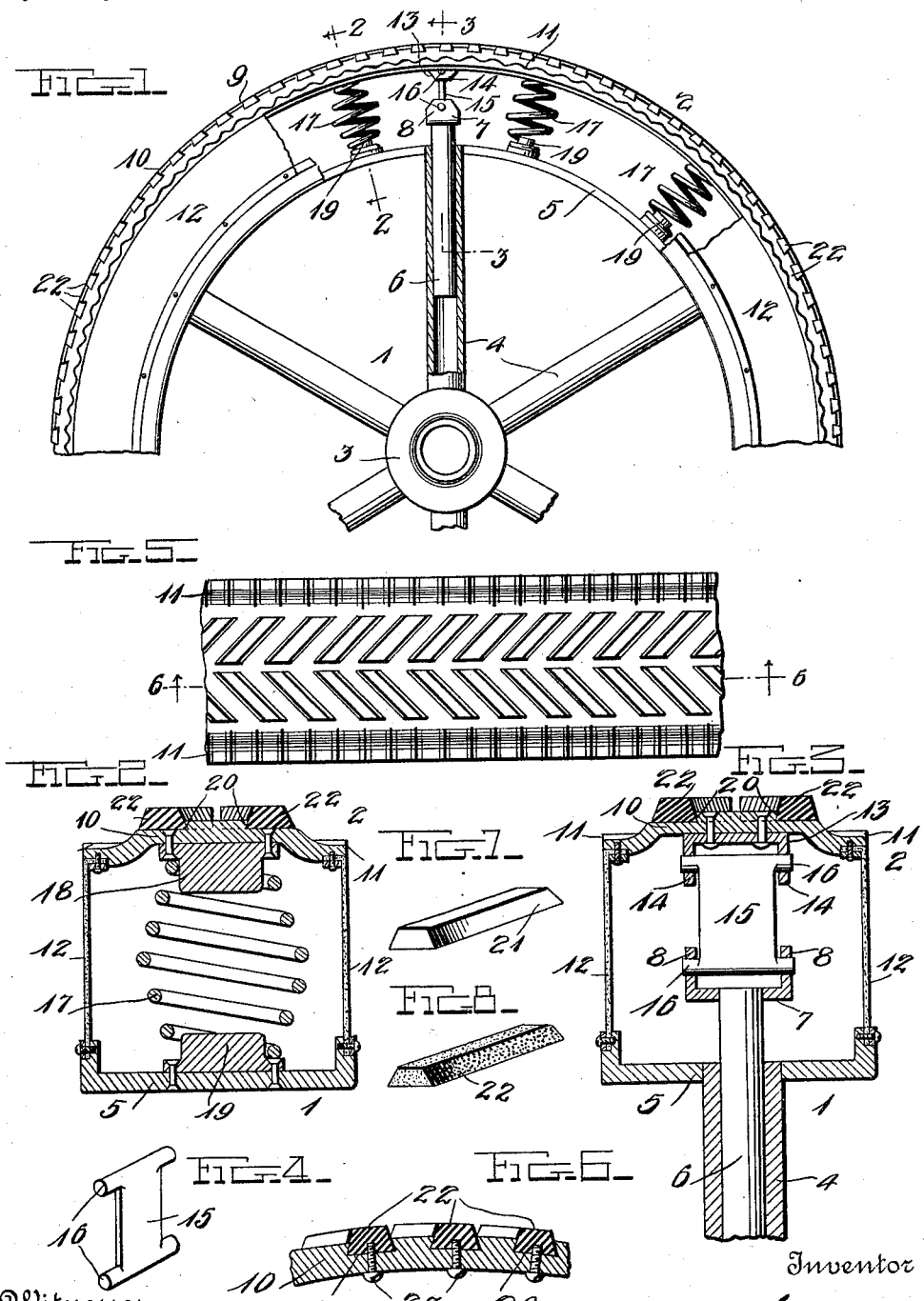

UNITED STATES PATENT OFFICE.

JOHN HENRY WELDON, OF COMANCHE, OKLAHOMA, ASSIGNOR OF ONE-HALF TO CHARLES SAM WADE, OF COMANCHE, OKLAHOMA.

SPRING-WHEEL.

1,030,442.  Specification of Letters Patent.  Patented June 25, 1912.

Application filed June 5, 1911. Serial No. 631,209.

*To all whom it may concern:*

Be it known that I, JOHN HENRY WELDON, a citizen of the United States, residing at Comanche, in the county of Stephens and State of Oklahoma, have invented certain new and useful Improvements in Spring-Wheels; and I do declare the following to be a full, clear, and exact description of the invention, such as will enable others skilled in the art to which it appertains to make and use the same.

This invention relates to improvements in spring wheels.

One object of the invention is to provide a wheel of this character having a stationary inner section and a yieldingly supported outer section adapted to take the place of a pneumatic tire whereby all the advantages of the latter will be imparted to the wheel and the disadvantages of this form of tire eliminated.

Another object is to provide a wheel of this character which will be simple, strong, durable and inexpensive in construction, efficient and reliable in operation and well adapted to the purpose for which it is designed.

With these and other objects in view, the invention consists of certain novel features of construction, combination and arrangement of parts as will be more fully described and particularly pointed out in the appended claims:—

In the accompanying drawings:—Figure 1 is a side view partly in section of a wheel constructed in accordance with my invention; Fig. 2 is a vertical cross sectional view on the line 2—2 of Fig. 1; Fig. 3 is a similar view on the line 3—3 of Fig. 1; Fig. 4 is a detail view of one of the connecting links between the outer rim and the loose outer spoke sections. Fig. 5 is a plan view of a portion of the tread of the outer rim or section of the wheel showing the construction and arrangement of the anti-slipping ribs applied thereto; Fig. 6 is a sectional view of the same on the line 6—6 of Fig. 5; Figs. 7 and 8 are detail views of the steel and rubber ribs for the outer rim or section of the wheel.

My improved wheel comprises an inner stationary section 1 and an outer yieldingly supported section 2. The inner section 1 comprises a hub 3 which may be of any suitable construction and to which is secured the inner ends of a series of radially disposed inner tubular spoke sections 4. The outer ends of the spoke sections 4 are rigidly secured to and open through an inner stationary rim 5. Telescopically engaged with the inner spoke sections 4 are a series of outer spoke sections 6 having on their outer ends cross heads 7. On the cross heads 7 are formed pairs of apertured bearing lugs 8. The outer section 2 of the wheel comprises an outer rim 9 having a central outwardly bulged tread portion 10 and crimped edges 11. To the edges 11 are secured flexible annular cover strips 12 the inner portions of which are suitably connected with the edges of the inner rim 5, said strips thus forming with the inner and outer rims, a casing in which are arranged the spoke connections and springs hereinafter described and by means of which dust and foreign matter is prevented from entering between the inner and outer sections of the wheel.

To the inner side of the central portion of the outer rim 9 opposite the ends of the spoke sections are secured spoke attaching brackets 13 comprising pairs of parallel apertured bearing lugs 14. Arranged between the cross heads 7 on the outer spoke sections 6 and the brackets 13 are connecting links 15 which preferably consist of flat plates having on their side edges at their opposite ends laterally extending pivot studs 16. The studs 16 of the outer ends of the plates are pivotally engaged with the apertured lugs 14 of the brackets 13 on the outer rim of the wheel while the studs on the inner ends of the plates are pivotally engaged with the lugs 8 of the cross heads 7 on the ends of the outer spoke sections whereby the latter are loosely connected to the outer rim of the wheel. Arranged between and to either side of the links 15 are radially extending coiled rim supporting springs 17 the outer ends of which are engaged with studs 18 arranged on the inner side of the outer rim 9 while the inner ends of the springs are engaged with studs 19 arranged on the inner rim 5. The springs are of greater diameter midway between their ends and decrease in size toward their ends as shown. By thus arranging the springs 17 the inner and outer rims will be yieldingly connected together and the inner section of the wheel held in position to yieldingly support the weight of a vehicle when the axles thereof are engaged with the hubs of the wheels. The loose hinged connection between the outer section of the spokes and the outer rim will permit the latter to freely give or yield under pressure and against the resistance of the springs 17 and will prevent the outer sections of any of the spokes from binding in the inner sections and thus interfering with the free movement of the outer rim.

The tread surface of the outer rim or section 2 of the wheel has formed therein a series of dove tail shaped grooves 20 said grooves being arranged in series, the grooves in one series being arranged at an angle or obliquely to the grooves of the other series as clearly shown in Fig. 5 of the drawings. The outer ends of the grooves open at the outer edges of the rim and their inner ends terminate adjacent to the center of the rims for a short distance from each other as shown. With the grooves are adapted to be removably engaged steel ribs 21 or rubber ribs 22, said ribs being dove tail shaped in cross section and are adapted to be removably secured in the grooves by set screws 23 which are arranged through the inner side of the rim and into engagement with the inner sides of the ribs as shown. Two sets of ribs 21 and 22 are provided and they are removably and interchangeably secured in the rim of the wheel so that when the latter is to be used on paved streets the rubber ribs may be applied to the rim thus preventing noise or slipping of the wheel and when the latter is to be used on country roads the rubber ribs may be removed and the steel ribs applied thus preventing slipping and providing a positive gripping surface for the wheel which will impart an increased pulling power thereto.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention what I claim is:

1. A spring wheel comprising an inner stationary section having arranged therein a plurality of tubular inner spoke sections, a series of outer spoke sections telescopically engaged with said inner section, cross heads arranged on the outer ends of said outer spoke sections, said cross heads having formed thereon apertured bearing lugs, an outer rim arranged around said inner stationary section of the wheel, brackets secured to the inner side of said rim, said brackets having apertured bearing lugs, links arranged between said brackets and cross heads of said outer spoke sections, said links having on their opposite ends laterally extending pivot studs adapted to engage the apertured lugs on said cross head and bracket whereby a double hinge connection is provided between the outer rim and said outer spoke sections, and springs arranged between said outer rim and stationary section of the wheel whereby said outer rim is yieldingly supported.

2. In a spring wheel an inner section comprising a hub, a rim, a series of tubular spoke sections fixedly connected at their inner ends to said hub and opening through and connected at their outer ends with said rim, a series of outer spoke sections having a telescopic engagement with said inner sections, said outer spoke sections having on their outer ends cross heads, apertured bearing lugs formed on said cross heads, an outer section comprising a rim arranged around and spaced a suitable distance from the rim of said inner section, a series of spoke attaching brackets secured to the inner side of said outer rim, apertured bearing lugs formed on said brackets, links having on their side edges at their opposite ends laterally extending pivot studs adapted to engage the bearing lugs on said cross heads and said brackets whereby a double hinge connection is provided between said outer spoke sections and the outer rim of the wheel, coiled springs arranged between said inner and outer rims whereby the outer section of the wheel is yieldingly supported, and studs secured to said inner and outer rims and adapted to receive the ends of the springs.

3. In a spring wheel, an inner section comprising a hub, a rim, and a series of spoke sections rigidly connecting these members; combined with a series of outer spoke sections movable through said rim on lines radial to the hub and having bearings at their outer ends, an outer rim also having bearings, all said bearings standing parallel with the axis of the hub, links pivotally connecting the inner and outer bearings, and expansive springs between the rims at either side of the several links.

In testimony whereof I have hereunto set my hand in presence of two subscribing witnesses.

JOHN HENRY WELDON.

Witnesses:
 Charles S. Wade,
 Will L. Click.

---

Copies of this patent may be obtained for five cents each, by addressing the "Commissioner of Patents Washington, D. C."